April 3, 1945. P. A. YERGER 2,372,923
LOAD-CONTROLLING APPARATUS FOR COMPRESSORS
Filed July 7, 1942 6 Sheets-Sheet 2

INVENTOR
Paul A. Yerger
BY
HIS ATTORNEY.

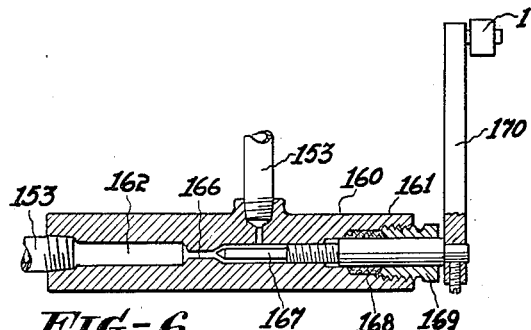
FIG.-6.
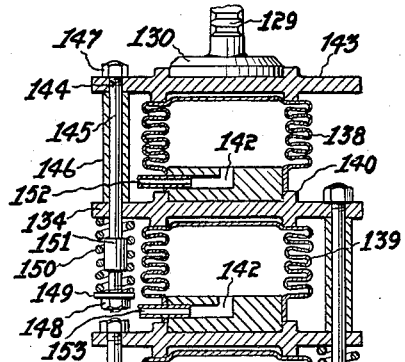
FIG.-4.
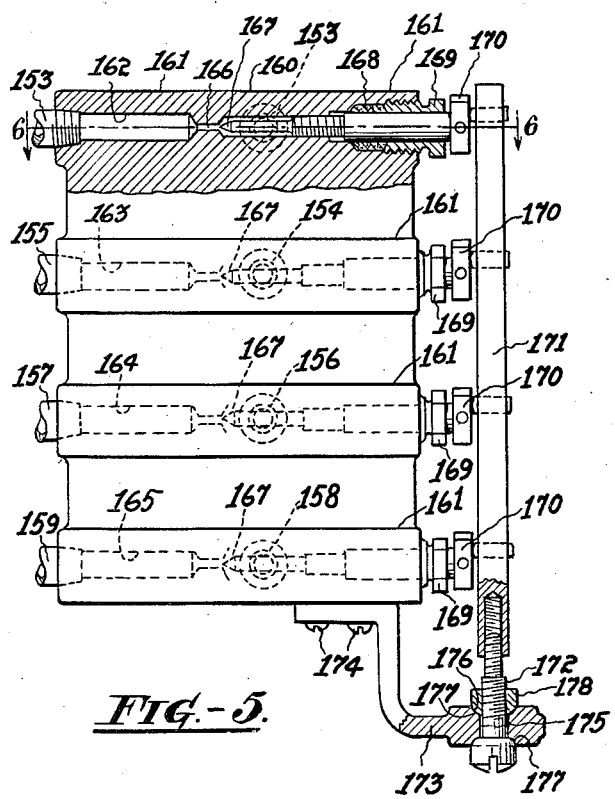
FIG.-5.
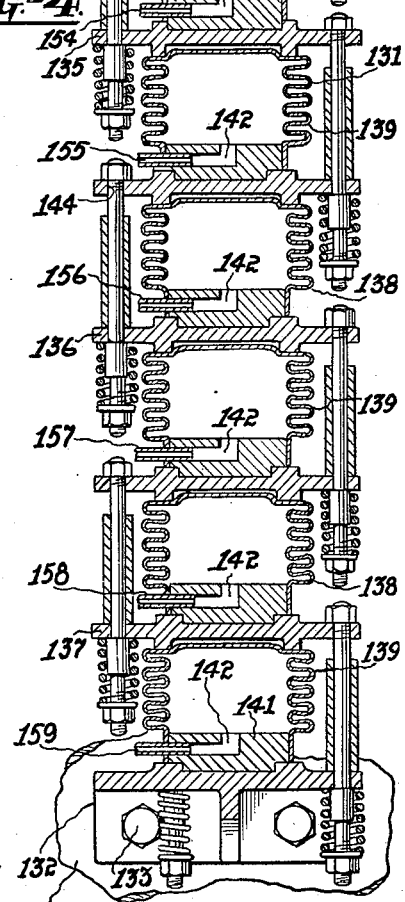
INVENTOR
Paul A. Yerger.
BY
HIS ATTORNEY.

April 3, 1945.   P. A. YERGER   2,372,923
LOAD-CONTROLLING APPARATUS FOR COMPRESSORS
Filed July 7, 1942   6 Sheets-Sheet 4
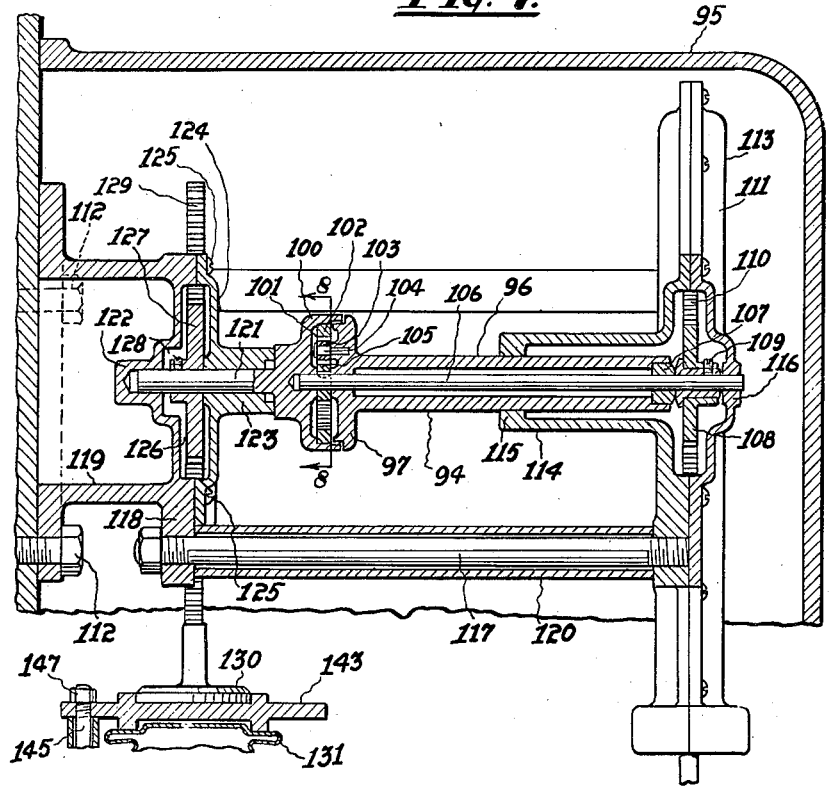
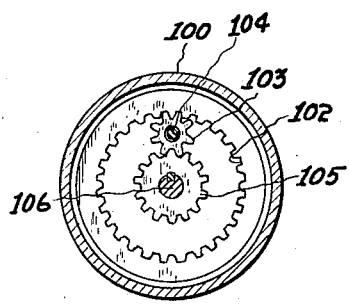
INVENTOR
*Paul A. Yerger.*
BY
HIS ATTORNEY.

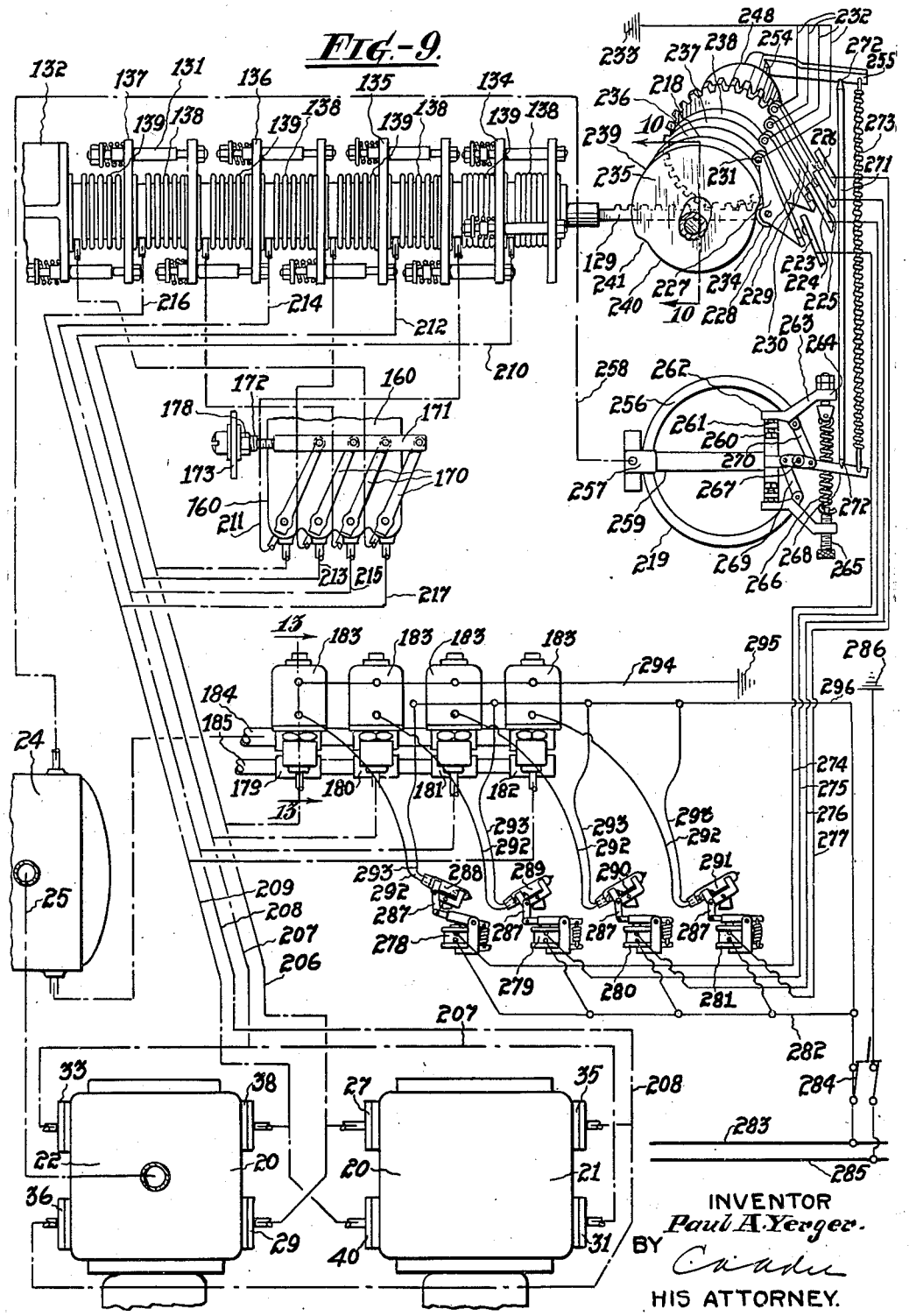

April 3, 1945. P. A. YERGER 2,372,923
LOAD-CONTROLLING APPARATUS FOR COMPRESSORS
Filed July 7, 1942 6 Sheets-Sheet 6
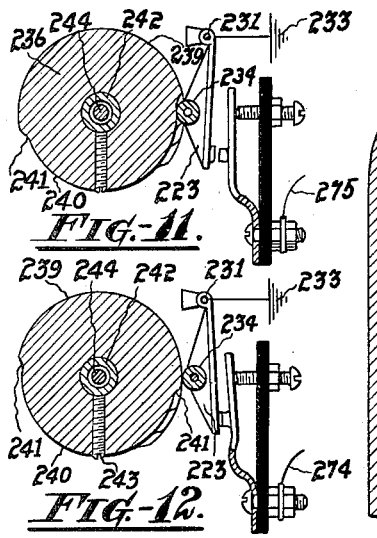
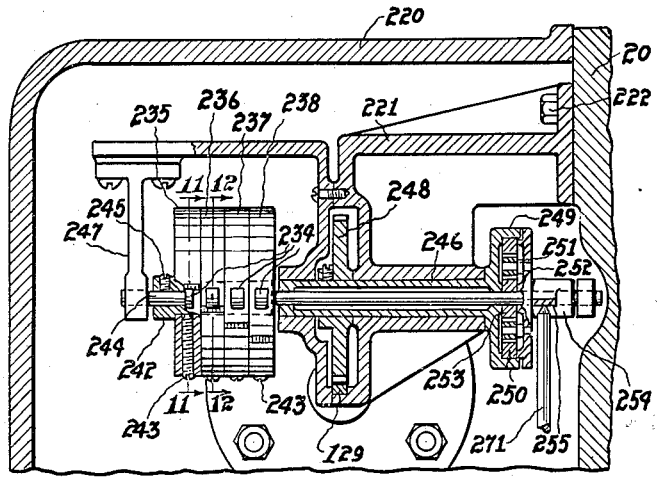
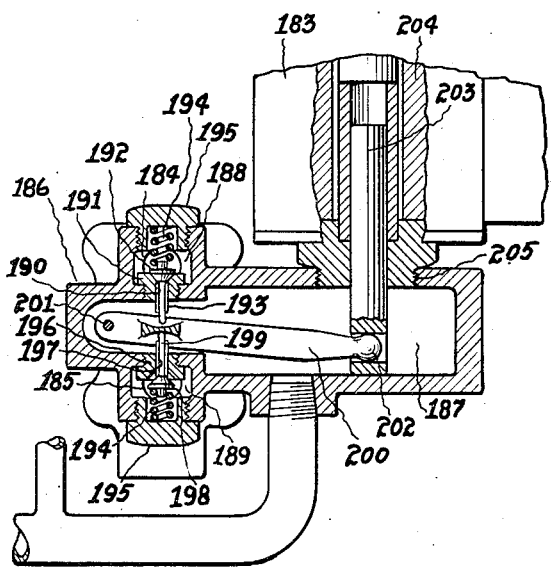
INVENTOR.
Paul A. Yerger.
BY
HIS ATTORNEY.

Patented Apr. 3, 1945

2,372,923

UNITED STATES PATENT OFFICE 2,372,923

LOAD-CONTROLLING APPARATUS FOR COMPRESSORS

Paul A. Yerger, Bloomsbury, N. J., assignor to Ingersoll-Rand Company, New York, N. Y., a corporation of New Jersey Application July 7, 1942, Serial No. 450,004

17 Claims. (Cl. 230—26)

This invention relates to compressors, and more particularly to a load-controlling apparatus for machines of this character.

One object of the invention is to so regulate the load on the compressor as to maintain the value of the pressure in the receiver system into which the compressor discharges within narrow ranges of deviation.

Another object is to eliminate the chances of a "hunting" action of the load-controlling apparatus so that said apparatus will act in a positive manner and only when necessary to perform their load-controlling functions.

Other objects will be in part obvious and in part pointed out hereinafter.

Figure 1:
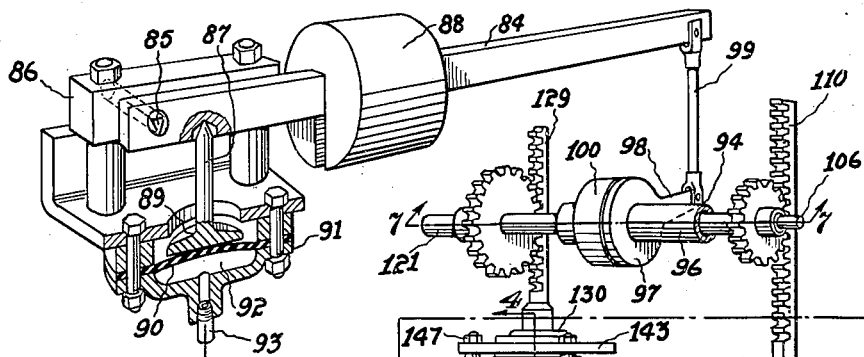
Figure 2:
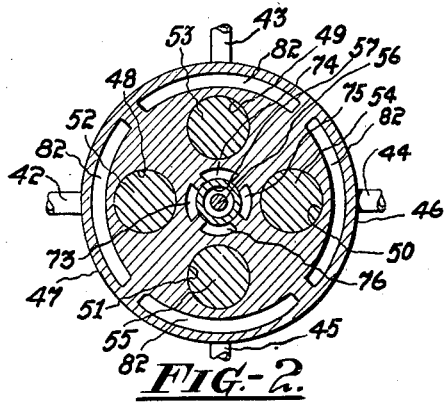
Figure 3:
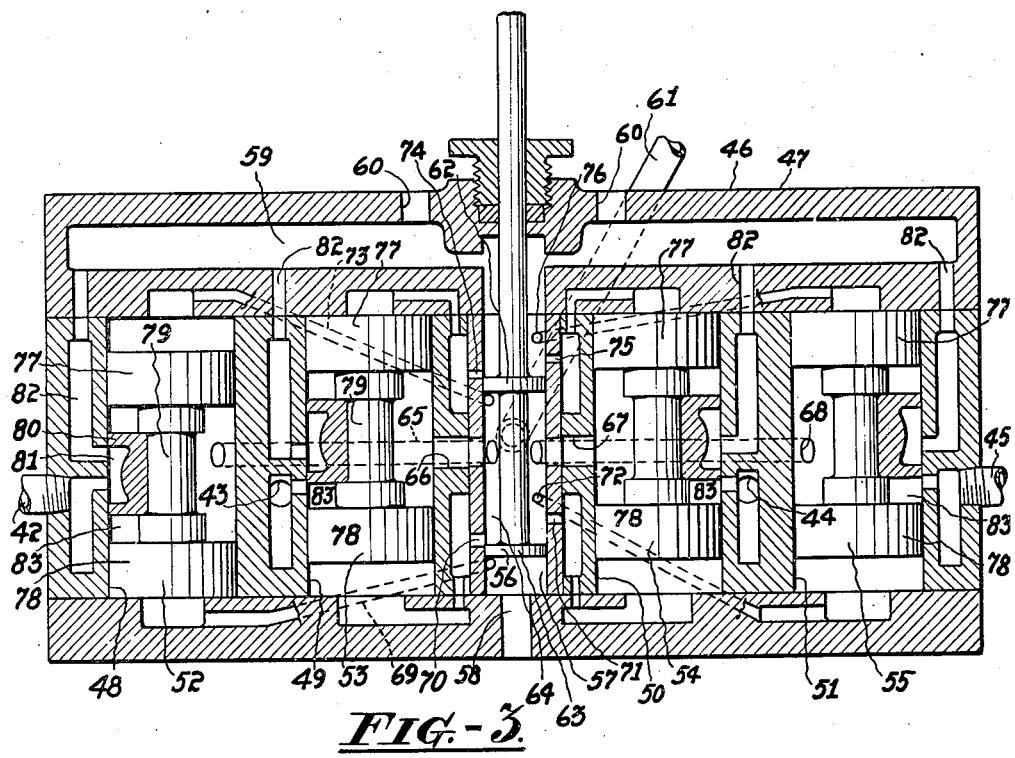

In the drawings accompanying this specification and in which similar reference numerals refer to similar parts, Figure 1 is a diagrammatic view, partly broken away, of a multi-stage compressor equipped with load-controlling apparatus forming the subject matter of the present invention, Figure 2 is a transverse view of a detail taken through Figure 1 on the line 2—2, Figure 3 is a diagrammatic, enlarged view, in section, of the detail illustrated in Figure 2, Figure 4 is a transverse view taken through Figure 1 on the line 4—4, Figure 5 is an enlarged view, partly in section, of a detail shown in Figure 1, Figure 6 is a transverse view taken through Figure 5 on the line 6—6, Figure 7 is a transverse view taken through Figure 1 on the line 7—7, Figure 8 is a transverse view taken through Figure 7 on the line 8—8, Figure 9 is a view similar to Figure 1 showing a modified form of the invention, Figure 10 is a transverse view taken through Figure 9 on the line 10—10, Figures 11 and 12 are transverse views taken through Figure 10 on the lines 11—11 and 12—12, respectively, and Figure 13 is a transverse view taken through Figure 9 on the line 13—13.

Referring to the drawings and at first more particularly to the form of the invention shown in Figure 1, 20 is a multi-stage compressor with low and high pressure cylinders 21 and 22, respectively, and driven by a motor 23. Suitable conduit means (not shown) may be provided for conveying the compressed fluid from the low pressure cylinder to the high pressure cylinder, and the discharge output of the high pressure cylinder 22 is conveyed to a storage receiver 24 by a conduit 25.

In order to enable the loading of the compressor to be effected in step-by-step fashion, each cylinder is provided with a plurality of load-controlling devices shown, for the sake of illustration, as consisting of four clearance chambers for each cylinder and valves of a well known type for controlling communication between the clearance chambers and the cylinders. The valves and the clearance chambers are brought into action in pairs and one chamber and a valve of a pair are located in the low pressure cylinder while the other chamber and the second valve of such pair are located in the high pressure cylinder. Thus, a clearance chamber 26 and a valve 27 controlling it are located adjacent the outer end of the low pressure cylinder 21 and a chamber 28 and its associated valve 29 are located in the high pressure cylinder 22 adjacent the crank end of said cylinder.

Similarly, a clearance chamber 30 and a valve 31 are located at the crank end of the low pressure cylinder 21 and are paired with a chamber 32 and its valve 33 located adjacent the outer end of the high pressure cylinder 22. In like manner, a clearance chamber 34 and its clearance valve 35 are arranged adjacent the outer end of the low pressure cylinder, as for example diametrically opposite the clearance valve 27, to operate simultaneously with a clearance valve 36 controlling a chamber 37 in the high pressure cylinder 22 and in the same transverse plane as the valve 29 and the chamber 28.

A fourth pair of clearance devices comprising a valve 38 and its clearance chamber 39 and another valve 40 to control a clearance chamber 41 are respectively arranged in the outer end of the high pressure cylinder 22 and in the crank end of the low pressure cylinder 21.

The pairs of clearance valves 27—29, 31—33, 35—36 and 38—40 are connected, respectively, by conduits 42, 43, 44 and 45 with a regulator 46 shown as being of the type forming the subject matter of U. S. Patent No. 1,430,578 to C. W. Metzgar, dated October 3, 1922. The regulator accordingly comprises a casing 47 having a series of valve chambers 48, 49, 50 and 51 containing main valves 52, 53, 54 and 55, respectively, that control the supply of pressure fluid to the clearance valves.

The main valves are, in turn, controlled by a pilot valve 56 that is reciprocable in a chamber 57 in the casing 47 and arranged centrally with respect to the group of main valves. The lower end of the valve chamber 57 is in constant communication with the atmosphere through a port 58, and the upper end of the valve chamber 57 is also constantly open to the atmosphere through a chamber 59 in the casing 47 and an exhaust port or ports 60.

The pressure fluid distributed by the pilot valve is conveyed into the valve chamber 57 from the storage receiver 24 by a conduit 61, and on the valve 56 are flanges 62 and 63 that lie, respectively, above and below the point of communication of the conduit 61 with the valve chamber and thus, in effect, define a movable chamber 64 for pressure fluid to supply the main valve chambers. Such pressure fluid is conveyed from the supply chamber 64 to the valve chambers 48, 49, 50 and 51, for distribution by the main valves, through passages 65, 66, 67 and 68, respectively, in the casing 47, said passages lying in the same transverse plane as the conduit 61 so that the main valve chambers will at all times be in communication with pressure fluid supply.

In order to effect actuation of the main valves, the casing 47 is provided with two groups of kicker passages that are controlled by the pilot valve 56. One group of kicker passages opens into the valve chamber 57 at points intermediate the supply conduit 61 and the exhaust port 58 and the other group opens into the valve chamber at points intermediate the supply conduit and the exhaust chamber 59. By reason of this arrangement the passages constituting the lowermost group may be communicated with either the atmosphere or with pressure fluid supply by the flange 63 of the valve, and the passages constituting the uppermost group may be communicated with the source of pressure fluid supply or with the exhaust chamber 59 by the valve flange 62, accordingly as the valve 56 is raised or lowered in the valve chamber 57. More specifically, a kicker passage 69 leads from the lower part of the valve chamber 57 to the corresponding end of the valve chamber 48, and other passages 70, 71 and 72 of the same group and communicating with the valve chamber 57 at progressively higher elevations lead to the lowermost ends of the valve chambers 49, 50 and 51, respectively. In this connection it might be stated that the points of communication of the passages 69 to 72 with the valve chamber 57 are spaced equi-distantly with respect to each other and a greater distance apart than the width of the flange 63 controlling them.

The pressure fluid serving to move the main valves to their lowermost limiting positions is conveyed into the valve chambers 48, 49, 50 and 51 by kicker passages 73, 74, 75 and 76, respectively. The points of communication of these passages with the valve chamber 57 is controlled by the flange 62 of the valve. They lie at progressively increasing elevations, in the order named, and like the lowermost group of passages are so spaced with respect to each other that the flange 62 may cover only one passage in any position that the pilot valve may assume.

As in the aforesaid patent, each main valve has upper and lower heads 77 and 78, respectively, that are connected by an axial stem 79. Each stem 79 carries a block 80 the outer surface of which slidably engages the wall of the valve chamber and has a recess 81 to afford communication between the supply conduits for the clearance valves and exhaust passages 82, in the casing 47, leading to the exhaust chamber 59. The main valves may be held in any suitable manner against rotation, and between the lower ends of the blocks 80 and the heads 78 are spaces 83 through which pressure fluid flows from the main valve chambers to the conduits 42, 43, 44 and 45 in the uppermost positions of the main valves.

The movement of the pilot valve 56 endwise of the valve chamber 57 is effected, in part, by a main actuator comprising a weighted lever 84, one end of which hinges on a pivot 85 seated in a frame 86 that may be suitably supported by the compressor 20. The lever 84 rests upon a pin 87 at a point between the pivot 85 and a weight 88 that is slidably adjustable upon the lever 84. On the lower end of the pin 87 is a base portion 89 that rests upon a diaphragm 90 which is clamped between the frame 86 and a cover 91, the latter being recessed to define a chamber 92 beneath the diaphragm 90. The chamber 92 is in constant communication with the storage receiver 24 through a conduit 93 to subject the diaphragm constantly to the pressure existing in the storage receiver.

In accordance with the practice of the invention, means are provided to cause the load-controlling apparatus of the compressor to effect its load-varying function in response to only slight variations in the value of the pressure of the fluid in the receiver system of the compressor and to assure a positive action of such apparatus. To these ends the movement of the lever 84 is imparted to the pilot valve 56 by transmission mechanism designated in its entirety by 94. The transmission mechanism may be arranged in a suitable casing 95, as illustrated more particularly in Figure 7 of the drawings, and comprises a hollow shaft 96 having an external flange 97 at one end that carries a lever 98. The free end of said lever is pivotally connected to an end of a link 99 having its other end pivotally connected to the end of the lever 84. Owing to this arrangement the oscillatory movement of the lever 84, about its pivot 85, will be transmitted to the hollow shaft 96 to cause said shaft to describe a similar movement.

The flange 97 forms a cover for and is rotatable with respect to a gear casing 100 having a recess 101 to accommodate differential gearing including an internal gear 102 that meshes with a pinion 103 rotatable on a shaft 104 seated in the outer end surface of the flange 97. The pinion 103 also meshes with a gear 105 keyed to a shaft 106 that extends axially through the hollow shaft 96 and has portions on the opposite sides of the gear 105 journaled in the flange 97 and in the gear casing 100.

The shaft 106 is additionally supported by a bearing 107 in the outer end of the hollow shaft 96, and on the shaft 106 adjacent the bearing 107, is a gear 108 that is locked to the shaft 106 by a set screw 109. The latter gear meshes with a rack 110 carried by the pilot valve 56 so that when the shaft 106 is rotated the pilot valve will be moved endwise of the valve chamber 57, either up or down depending upon the direction of rotation of the shaft 106. The arrangement of the shafts and the gearing employed for transmitting movement from one shaft to the other is such that the pilot valve 56 will at all times follow the movement of the weighted lever 84.

Within the casing 95 is a frame, designated in its entirety by 111, which is secured at one end to the casing 95 by bolts 112 and forms a support for the transmission mechanism 94. The frame 111 comprises a housing 113 to receive the rack 110 and the gear 108 and has a hollow extension 114 the outer end of which constitutes a bearing 115 for an intermediate portion of the hollow shaft 96 to hold said shaft coaxial with the bearing 115, and on the opposite side of the housing 113 is a bearing 116 for the shaft 106.

The housing 113 is held in the assembled position by bolts 117 threadedly connected to the housing and extending through the flange 118 of a distance piece 119 which itself is secured to the casing 95 by the bolts 112. Spacers 120 encircling the bolts 117 abut the housing 113 and the flange 118 to hold the housing in suitably spaced relation with respect to the distance piece.

As will appear obvious from the foregoing description the pilot valve 56 is actuated in a positive manner, in response to movement, however slight, of the lever 84. In order, therefore, to preclude a "hunting" action of the pilot valve and consequently a wavering action of the clearance valves, means are provided for imparting movement to the pilot valve independently of the main actuator for shifting the pilot valve from one controlling position to another. To this end the gear casing 100 is rendered rotatable relatively to the shafts 96 and 106. The gear casing has a shaft portion 121 arranged coaxially with the shaft 106 and journaled at its free end in a bearing 122 in the distance piece 119. The shaft 121 is additionally supported by a bearing 123 that lies between the gear casing 100 and the distance piece and forms an integral part of a plate 124 that is secured to the end of the distance piece by screws 125.

In the opposed surfaces of the distance piece and the plate 124 is a recess 126 to accommodate a gear 127 that is secured to the shaft 121 by a set screw 128 and meshes with a rack 129 extending slidably into the recess 126 for effecting rotary movement of the gear casing 100. At one end of the rack is a flange 130 that may be secured, in any well known manner, to an end of an actuating element 131 having its other end suitably affixed to a bracket 132 which may be secured to a support by bolts 133.

In the form shown, the actuating element 131 is extensible and contractible endwise in the plane of movement of the rack 129, being actuated in one direction by pressure fluid and in the opposite direction by spring pressure. In a more specific sense, it consists of a series of pairs, four in the present instance, of bellows designated by pairs as 134, 135, 136 and 137 and, as will be readily apparent, equal in number of pairs the control positions of the pilot valve and the pairs of clearance valves. Each pair of bellows includes a primary bellows 138 and a secondary bellows 139, and between the ends of adjacent bellows are heads 140 that may be secured to the bellows in any suitable manner, as for example by welding.

A suitable head 141 is also provided for the secondary bellows 139 of the end pair designated 137, and in each head is a passage 142 for the admission and exhaust of pressure fluid into and from the bellows. A plate 143 is interposed between the flange 130 and the adjacent bellows 138, and in the marginal portions of each head 140 and in the bracket 132 are apertures 144 to accommodate bolts 145 that serve, in part, to maintain all portions of the actuating element in substantially the same axial plane.

The bolts 145 extend loosely through the apertures 144 and spacers 146 in the form of sleeves are disposed about them to engage the marginal portions of the heads 140 for limiting the extent of contractile movement of the bellows. Each bolt carries a nut 147 on one end that seats against the end surface of a head positioned at one end of a bellows, and a nut 148 is threaded on the other end of each bolt to act as a support for a plate 149 serving as a seat for a spring 150 encircling the bolt and acting against a head at the other end of the same bellows for effecting contractile movement of the bellows.

The nut 148 is adjustable on the bolt so that the tension of the spring 150 may be varied, if desired, and on the portion of the bolt encircled by the spring 150 is a collar 151 to engage the adjacent head 140 for limiting the degree of extension of the bellows. Thus, the distance between the opposed surfaces of the collars 151 and the nuts 147 determine the length that each bellows may be extended and the nuts 147 are, of course, adjustable on the bolts 145 so that such distance, as well as the total length of extension of the actuating element 131, may be varied.

The flow of pressure fluid to and from the bellows is initiated simultaneously for both bellows of a pair and simultaneously with the delivery to and the exhaust of fluid from the clearance valves. A conduit 152 is accordingly extended from the conduit 42, of the clearance valves 27—29, to the port 142 of the primary bellows of the group designated 134, and a branch conduit 153 leads from the conduit 152 to the secondary bellows 139 of said pair. In like manner a conduit 154 and its branch conduit 155 lead, respectively, to the primary and secondary bellows of the pair designated 135 and communicate with the conduit 43 leading to the clearance valves 31—33.

Similar conduit arrangements are provided for the remaining pairs of bellows, that is to say, a conduit 156 and a branch 157 leading therefrom are connected to the primary and secondary bellows of the group designated 136 and to the supply conduit 44 of the clearance valves 35—36, and a supply conduit 158 and a branch 159 are connected, respectively, to the primary and secondary bellows of the pair designated 137 and communicate with the conduit 45 leading to the clearance valves 38—40.

In the form of the invention illustrated, the admission and exhaust of pressure fluid take place unrestrictedly only in the primary bellows 138 of each pair and at the same rate as the fluid flow to and from the clearance valves. The flow of pressure fluid to and from the secondary bellows 139 of the several pairs, on the other hand, is restricted so that a greater time interval is required for the full extension and the effective contraction of said secondary bellows than for the primary bellows.

The means controlling such delayed action of the secondary bellows may consist, as shown, of valve mechanism 160 interposed in the branch conduits 153, 155, 157 and 159. The valve mechanism 160 comprises a casing 161 having passages 162, 163, 164 and 165 that afford communication between the sections of the branch conduits 153, 155, 157 and 159, respectively. Each passage in the valve casing 161 has a restricted portion 166 that is controlled by a needle valve 167 threaded into the casing. Suitable packing material 168 is disposed in the casing 161 to encircle the stem portion of the needle valve and said packing material may be compressed by a gland 169 which also serves as a guide for the needle valve.

As a preferred arrangement, means are provided to enable all the needle valves to be adjusted simultaneously and in the same degree with respect to the restricted portions 166 so that the effective flow areas they define will be the same in each of the passages in the valve casing 161. The needle valves are accordingly provided with cranks 170 that are pivotally connected to a beam 171 whereby all the needle valves may be simultaneously rotated toward or away from the mouths of the restricted portions 166.

Convenient means for effecting such adjustment of the needle valves and for holding them firmly against unauthorized movement consists of a screw 172 threaded into an end of the beam 171 and supported by a bracket 173 secured to the valve casing 161 by screws 174. The hole 175 in the bracket 173 through which the screw 172 extends is of ample size so that the screw may readily adjust itself therein for alignment with the beam 171 accordingly as the latter may be shifted for rotating the needle valves. At the ends of the aperture 175 are concavities 176 to receive a convex end surface 177 on the head of the screw 172 and a similar surface 177 on a nut 178 threaded on the screw 172 for locking said screw fixedly in position.

In the operation of the compressor and assuming that the pressure in the receiver system is between the minimum and maximum values at which the load-controlling devices become operative the pilot valve 56 will assume a position to communicate all of the passages leading to the lower ends of the main valve chambers of the regulator 46 with pressure fluid supply. The pressure fluid thereby admitted into the main valve chambers will hold the main valves in their uppermost limiting positions. Pressure fluid will then flow from the main valve chambers through the spaces 83 in the main valves and the conduits 43, 42, 44 and 45 to the clearance valves and maintain all of the clearance valves in closed position to prevent communication between the compressor cylinders and the clearance chambers.

At the same time, pressure fluid flowing through the conduits 152 to 158 inclusive, and their branches will inflate the bellows and cause full extension of the actuating element 131 to the limit permitted by the nuts 147 and the shoulders 151. The actuating element 131 will remain fully extended as long as the pilot valve occupies substantially the position described and variations in the value of the pressure within the storage receiver will not have the effect of causing movement of the rack 129.

The main actuator is, however, directly and constantly responsive to receiver pressure acting against the diaphragm 90 and any movement imparted thereby to the lever 84 will be transmitted by the hollow shaft 96, the pinion 103, the gears 105 and 108 and the shaft 106 to the pilot valve 56. Thus, if in these positions of the parts the discharge output of the compressor exceeds the demand the increasing pressure in the storage receiver will cause the lever 84 and the pilot valve to rise and when the predetermined maximum pressure is attained in the storage receiver the pilot valve 56 will have reached a position to partly uncover the passages 69 and 73. The pressure fluid in the lower end of the main valve chamber 48 will then be exhausted to the atmosphere and pressure fluid will simultaneously be admitted into the upper end of said valve chamber and move the main valve 52 to its lowermost limiting position.

In the new position of the valve 52 the conduit 42 will be in communication with the atmosphere through the recess 81, the passage 82, the exhaust chamber 59 and the ports 60 to permit the immediate exhaust of pressure fluid from the clearance valves 27—29 and also from the primary bellows 138 of the pair 134. Upon the exhaust of fluid from the said primary bellows the associated springs 150 will contract said bellows and cause the rack 129 to rotate the gear casing 100 in a clockwise direction, as Figure 7 is viewed from the right hand side of the drawings.

These movements of the gear casing and of the internal gear 102 will rotate the pinion 103 in the same direction and will have the effect of turning the shaft 106 and the gear 108 in a counter-clockwise direction and move the pilot valve upwardly to a position in which the flange 63 is approximately midway between the passages 69 and 70. The flange 62 will then also occupy a similar position with respect to the passages 73 and 74. In this way the pilot valve is shifted immediately out of a controlling position into a neutral position and at the pressure existing in the storage receiver at the instant the pilot valve is moved through the controlling position. The flanges of the pilot valve are then well removed from the adjacent passages leading to the main valve chambers and the pressure conditions in these passages and associated channels will, therefore, not be disturbed by a possible wavering action of the pilot valve incident to the partial unloading of the compressor.

At the instant the conduit 42 is communicated with the atmosphere fluid will also exhaust from the secondary bellows 139 of the pair 134 but this flow takes place comparatively slowly and, assuming that the needle valve 167 occupies a correct position of adjustment, at such a rate that the contractile movement of the secondary bellows, transmitted through the transmission mechanism 94 and off-set to some extent by the downward movement of the arm 84, will carry the pilot valve to a position in which only sufficient portions of the passages 70 and 74 remain uncovered to assure the retention of the main valve 53 in its uppermost limiting position. The pilot valve will then occupy a position in which only a slight increase in the pressure in the storage receiver acting against the diaphragm 90 will carry the pilot valve through this new controlling position.

In actual practice, it has been found that only a matter of a fraction of a pound increment in receiver pressure is required to thus elevate the pilot valve to a position for cutting off communication between the passage 70 and pressure fluid supply and between the passage 74 and the atmosphere and at the same time to place the passage 70 in communication with the atmosphere and the passage 74 in communication with pressure fluid supply.

After the pilot valve has been thus again shifted the same sequence of events following the shifting upwardly of the valve 52 will take place with respect to the valve 53 and the elements controlled thereby, that is to say, the pressure fluid will be exhausted from the clearance valves 31—33 and successively from the bellows comprising the pair 135 so that the compressor will then be operating at one-half load. The pilot valve 56 will then again be so positioned, by the action of the bellows of the pair 135, that only a slight additional increase of receiver pressure will be required to move the pilot valve upwardly for initiating another step of unloading.

The remaining groups of load-controlling and pilot valve positioning devices will be brought successively into action until the compressor is completely unloaded. This, however, is true only in the event that pressure fluid consumption is less than delivery to the storage receiver, so that the receiver pressure continues to increase, and is not a necessary incident to the operation of the compressor and its load-controlling apparatus. Obviously, under all fractional load conditions at which the compressor may operate the demands upon the storage pressure may be in excess of immediate delivery to the storage receiver to cause a decreasing pressure therein. In such event additional load will, of course, be applied to the compressor by the load-controlling devices which will then operate in an order that is a reversal of the sequence of their action for effecting the unloading of the compressor. Thus, if the compressor is operating at, say, one-half load and in which case the pilot valve is positioned so that its flange 63 partly overlies the passage 71 and the flange 62 blanks off the major portion of the passage 75, a position to which the pilot valve had been moved in anticipation of a continued increase of receiver pressure, the pilot valve will, by reason of the falling receiver pressure, at once move downwardly in the valve chamber 57. In so doing the said valve uncovers the upper portions of the passages 74 and 70, thereby releasing the pressure fluid in the upper end of the main valve chamber 49 to the atmosphere and simultaneously valving pressure fluid from the chamber 64 into the lower end of said main valve chamber.

The main valve 53 will then be shifted upwardly and admit pressure fluid through the conduit 43 to the clearance valves 31—33, to close said clearance valves, and also through the conduits 154 and 155 to the bellows comprising the group 135. The immediate effect of admission of pressure fluid to said bellows will be to cause full extension of the primary bellows 138. This action of said primary bellows will be transmitted by the rack 129 through the transmission mechanism to the pilot valve 56. The pilot valve will thereby be immediately shifted to a position in which the flange 63 lies midway between the passages 70 and 69 and the flange 62 will occupy a similar position with respect to the passages 73 and 74.

In the new position the pilot valve will then be prevented from moving to a point in the valve chamber 57 at which a variation in the pressure in the receiver resulting from the application of additional load to the compressor, and causing movement of the main actuator, might shift the said valve into such position with respect to the passages lying directly on opposite sides of the valve flanges that the main valve 53 and, therefore, the elements which it controls would be caused to act prematurely. The pilot valve may, however, be shifted slightly by the main actuator acting in response to a pressure rise in the receiver system following the reloading of the compressor. Such movement will, however, be off-set by the delayed action of the secondary bellows 139 of the pair 135 which, acting through the transmission mechanism 94, will move the pilot valve to the lowermost permissible position in which the passage 69 leading to the main valve chamber 48 may still remain in communication with the atmosphere and a sufficient area of the passage 73 will remain in communication with the chamber 64 to assure the retention of the main valve 52 in its lowermost limiting position.

These flow areas of the passages 69 and 73 need be of only small degree so that only a slight further decrease in receiver pressure is required to lower the pilot valve for applying the final step of loading to the compressor and to initiate action of the associated pair of bellows 134 for effecting complete loading of the compressor and to cause the pair of bellows 134 to place the pilot valve in its lowermost limiting position.

In the modified form of the invention illustrated, Figures 9 to 13 inclusive, the compressor is provided with both pneumatically and electrically actuated devices for controlling its load. Included among these devices are a series, in the present instance four, valve mechanisms designated 179, 180, 181 and 182 and shown in detail in Figure 13. The said valve mechanisms are each actuated by a solenoid 183 and control the flow of pressure fluid to the clearance valves of the compressor 20 and also to the actuating element 131. The valve mechanisms are, moreover, each connected to a common pressure fluid supply conduit 184 leading from the storage receiver 24 and also to a common exhaust conduit 185 that provides an outlet for the fluid exhausted from the clearance valves and from the actuating element.

The valve mechanisms 179 to 182 are of identical construction and comprise a casing 186 that is recessed to provide a chamber 187 through which pressure fluid flows to and from the actuating element 131 and the clearance valves. In the form of valve mechanism shown the casing 186 is provided on opposite sides of the chamber 187 with recesses 188 and 189 that are respectively in constant communication with the supply conduit 184 and the discharge conduit 185.

Communication between the recess 188 and the chamber 187 is effected through a passage 190, in a bushing 191 threaded into the wall of the casing 186, and is controlled by a poppet valve 192, the stem 193 of which extends into the chamber 187. The valve 192 is normally held against its seat by a spring 194 interposed between the valve 192 and a plug 195 forming a closure for the outer end of the recess 188.

In like manner, a bushing 196 is arranged between the recess 189 and the chamber 187 and has a passage 197 to afford communication between said recess and the chamber. The passage 197 is controlled by a valve 198, also of the poppet type, having a stem 199 that extends into the chamber 187. The valve 198 is urged against its seat by a spring 194 interposed between the said valve and a plug 195 threaded into the casing 186 to seal the recess 189.

The valves 192 and 198 are both unseated by a common element shown as being in the form of a bar 200 that is pivoted at its outer end on a pin 201 which may be seated in the casing 186. The bar lies between the free ends of the valve stems 193 and 199 so that when said bar is oscillated in the chamber 187 one or the other of the valves will be unseated.

The inner end of the bar 200 is in the form of a sphere 202 and is seated in an end of an armature 203 extending into the chamber 187. The armature 203 is slidable, in a well known manner, within the core 204 of the solenoid 183 and said solenoid may be suitably affixed to the casing 186 by threaded engagement, as indicated at 205.

In this form of the invention each pair of clearance valves is also controlled by an individual valve mechanism and the clearance valves 27—29 are accordingly communicated with the valve mechanism 179 by a conduit 206. Likewise a conduit 207 extends from the valve mechanism 180 to the clearance valves 31—33, a conduit 208 affords communication between the clearance valves 35—36, and the valve mechanism 181 and the remaining pair of clearance valves 38—40 are connected with the valve mechanism 182 by a conduit 209.

As a preferred arrangement the conduits supplying pressure fluid to the actuating element 131 are connected to the conduits leading from the control valve mechanisms to the clearance valves. Accordingly, the conduit 210 leads from the conduit 206 to the primary bellows 138 of the pair designated 134 and has a branch 211 extending to the secondary bellows 139 of the said pair.

Similarly, a conduit 212 extends from the conduit 207 to the primary bellows 138 of the pair designated 135 and a branch 213 leads from the conduit 212 to the secondary bellows of the last mentioned pair of bellows. In like manner the primary bellows 138 of the pair designated 136 is in communication with the conduit 208 through a conduit 214 and a branch 215 leads from the latter conduit to the secondary bellows 139 of the last mentioned pair of bellows, and the primary member 138 of the remaining pair 137 of bellows is connected to the conduit 209 by a conduit 216 having a branch 217 leading to the secondary bellows 139 of said pair.

In this form of the invention the flow of pressure fluid to and from the primary bellows of each pair also takes place unrestrictedly and valve mechanism 160 similar to that described in connection with the form of the invention shown in Figure 1 is interposed in the branch conduits 211 to 217 inclusive in order to restrict the flow of pressure fluid to and from the secondary bellows to delay their actions.

The energization of the solenoids 183 for operating their valve mechanisms is controlled by a switch means, designated in general by 218, and controlled by a main actuator 219 that acts constantly in response to the pressure in the storage receiver 24 and by the actuating element 131. The switch mechanism 218 may be arranged in a suitable casing 220 and supported by a frame 221 attached to a convenient support (not shown) by bolts 222. The switch means comprises a series of circuit making and breaking devices including stationary contacts 223, 224, 225 and 226 that may be mounted upon a suitable panel and cooperate, respectively, with movable contacts 227, 228, 229 and 230 for controlling the flow of electrical energy to the solenoids. The movable contacts are pivoted at their upper ends upon a pin 231 and are connected, by wires 232, to a ground 233.

Intermediate the ends of the movable contacts are rollers 234 for engagement with the peripheral surfaces of cams 235, 236, 237 and 238 serving, respectively, to actuate the movable contacts 227, 228, 229 and 230. The peripheral contour of each cam is described by two radii of different lengths and consists of semi-cylindrical surfaces 239 and 240 of approximately equal length and joined by curved surfaces 241 that may substantially conform with the curvature of the rollers 234.

The cams are arranged upon a sleeve 242 and affixed to said sleeve in any suitable manner, as for example by set screws 243. The sleeve 242 is, in turn, disposed about a shaft 244 and secured thereto by a set screw 245. The shaft 244 extends through and is journaled in a hollow shaft 246 which itself is journaled in the frame 221. The shaft 244 may be additionally supported adjacent the outermost cam 235 by a bearing 247 depending from the frame 221.

The hollow shaft 246 carries a gear 248 that may be suitably affixed to the shaft and meshes with the rack 129 of the actuating element 131. The hollow shaft also carries at its outer end a gear casing 249 that contains an internal ring gear 250 which may be secured to the gear casing in any well known manner and meshes with a pinion 251 carried by a cover 252 for the gear casing. The pinion 251 also meshes with a gear 253 carried by the shaft 244 for transmitting movement from one shaft to the other.

The gear casing 249 and the cover 252 are rotatable with respect to each other, as will be readily understood from the foregoing description, and the cover 252 is rotatable upon the shaft 244. In the form illustrated, the cover has a hub 254 to provide ample bearing surface for the cover on the shaft 244 and on said hub is a lever 255 to which force resulting from the action of the main actuator 219 is applied for rotating the shaft 244 and such other elements as may rotate in consequence of the movement of the said shaft.

Although any suitable main actuator may be employed to serve this purpose it is preferred that, as indicated in Figure 9 of the drawings, it consists of a flexible tube 256 bent into the form of a circular arc that is supported intermediate its ends by a bracket 257 to which is connected a conduit 258 for conveying pressure from the storage receiver 24 into the tube 256 to cause the curvature of the portions of said tube lying on opposite sides of the bracket 257 to vary in response to the fluctuations of the pressure in the storage receiver. The bracket 257 may, as illustrated, have an extension 259 that terminates near the ends of the tube and carries a cross piece 260 wherein are arranged screws 261 that serve as adjustable seats for ends 262 of arms 263 on the ends of the tube 256 and extending transversely thereof.

Each end of the tube 256 may be attached to an intermediate portion of an arm in any suitable manner, and in the ends 264 of the said arms lying outside of the tube are adjustable eye-bolts 265 the eyes of which are connected to the ends of a tension spring 266 that acts to resist outward movement of the unsecured portions of the tube 256 with respect to each other.

In the arrangement shown the free end of the extension 259 terminates between the ends of the tube 256 and carries a pivot pin 267 that extends through an intermediate portion of a lever 268 the inner end of which is pivotally connected to an end of a link 269 that is pivotally attached with its other end to an end of the tube 256. In like manner a link 270 is pivotally connected at one end to the other end of the tube 256 and said link 270 is pivotally attached to the lever 268 at a point intermediate the pivot pin 267 and the outer end of the said lever. The points at which the links 269 and 270 are connected to the lever 268 are located equidistantly from the pivot pin 267 so that when the free moving portions of the tube 256 uncurl, or tend to assume their normal shapes, the force resulting from such movements of both the unsupported portions of the tube is applied to the lever 268 for oscillating it about the pivot 267. This movement of the lever 268 is transmitted, in the present instance, to the lever 255 by a rod 271 interposed between said levers. The ends 272 of the rod 271 are preferably pointed to provide only small areas of contact between the rod 271 and the levers and thereby minimize friction between these elements.

To the end that the levers 255 and 268 will at all times be held firmly against relative movement a tension spring 273 is attached to the outer end of the lever 255 and to the corresponding end of the lever 268 to exert a constant pull upon the said levers for holding them firmly against the rod 271.

As a preferred arrangement, the energization of the solenoids 183 is controlled by suitable relay switches which are themselves controlled by the switch means 218. To this end the wires 274, 275, 276 and 277 leading from the stationary contacts 223, 224, 225 and 226 are connected, respectively, to relays 278, 279, 280 and 281 and the electrical current for operating the relays is supplied thereto by a wire 282 that is connected to a wire 283 of a primary circuit by means of a switch 284 that also forms a connection between the other wire 285 of the primary circuit and a ground 286.

The relays 278, 279, 280 and 281 may be of any suitable type to operate suitable spring-pressed linkage 287 for actuating tilt switches 288, 289, 290 and 291, respectively, of the mercury type, that control the circuits of the solenoids. Each tilt switch has the usual pair of wires 292 and 293, the former being connected to the core of the solenoids and to a wire 294 leading to a ground 295. The wires 293, on the other hand, are connected to a wire 296 that may, as shown, be connected to the wire 282 and is, therefore, also controlled by the hand switch 284.

In the operation of the compressor, and again assuming that the pressure in the receiver system is between the minimum and maximum values at which the load controlling devices become operative, all of the tilt switches 288 to 291 inclusive will be in position to effect energization of the solenoids 183. All of the arms 200 of the valve mechanisms 179—182 will then occupy their uppermost limiting positions to open the valves 192 so that pressure fluid will flow from the storage receiver 24 through the chambers 187 to the clearance valves for holding all the clearance valves in the closed positions and to cause all the bellows of the actuating element 131 to be fully extended.

In these positions of the parts all of the rollers 234 rest upon the surfaces 239 of their respective cams although at different distances from the adjacent ends of the surfaces 239. Thus, the roller 234 of the contact 227 may rest closely adjacent the juncture of the surfaces 239 and 241 of the cam 235 and the rollers of the contacts 228, 229 and 230 will lie at progressively increasing distances from the corresponding points of the cams controlling them. All of the movable contacts will then be in engagement with the stationary contacts and the relays 278 to 281 will be energized and the tilt switches will be positioned to close the circuits of the solenoids 183.

Under these conditions the compressor will be operating at full load and if then the discharge output of the compressor exceeds the demand upon the receiver system, so that the pressure within the storage receiver reaches the maximum that it is intended to maintain therein, the tube 256 will be caused to uncurl. This action of the tube, transmitted through the links 269 and 270, will tilt the outer ends of the lever 268 and 255 upwardly and cause the pinion 251 to describe a counter-clockwise movement, as Figure 10 is viewed from the right hand end of the drawings, and the shaft 244 and the cams 235 to 238 to rotate in a clockwise direction.

Upon a slight degree of rotative movement of the cams, in the direction described, the roller 234 of the contact 227 will drop from the arc 239 to the arc 240. The contact 227 will then be out of engagement with the contact 223 and the circuit of the relay 278 will be open. The spring-pressed linkage of this relay will then act to tilt the switch 288 and open the circuit of the solenoid controlling the valve mechanism 179. The armature 203 of said solenoid will then descend, to the position shown in Figure 13, thereby permitting the valve 192 to move to its closed position, for cutting off communication between pressure fluid supply and the conduit 206, and at the same time the arm 200 will open the valve 198 to communicate the chamber 187 with the discharge conduit 185.

In the new positions of the valves 192 and 198 pressure fluid will escape from the clearance valves 27—29 to the atmosphere and simultaneously pressure fluid will escape from the bellows 138 and 139 of the pair designated 134. The flow of pressure fluid from the said primary bellows will take place at the same rate as the exhaust of fluid from the clearance valves so that a partial rotative movement, in a clockwise direction as Figure 10 is viewed from the right hand end of the drawings, is imparted to the cams to position the roller 234 of the contact 228 approximately midway between its former position and the end of the surface 239.

By reason of the restricted flow of fluid from the secondary bellows 139 of the pair 134 said secondary bellows will contract comparatively slowly but in so doing will impart an additional gradual rotative movement to the cams to bring the cam 236 to a position in which the roller 234 of the contact 238 rests immediately adjacent the end of the surface 239. In these positions of the parts the compressor will be operating at three-quarter load, and if the discharge output of the compressor thereafter continues to exceed consumption only a slight increment in the value of the pressure in the receiver system is required to effect a slight uncurling movement of the tube 256 for actuating the cams the slight distance required to enable the roller 234 of the contact 229 to drop from the surface 239 to the surface 240 of the cam 236.

The circuit of the relay 279 will thereby be opened so that the solenoid 183 of the valve mechanism 180 will be deenergized. The valves 192 and 198 of said valve mechanism 180 will then be shifted to exhaust the fluid from the clearance valves 31—33, for effecting another step of unloading, and to exhaust pressure fluid from the bellows constituting the pair 135. These bellows will then collapse successively and will act in the manner described in connection with the pair of bellows 134 to again position the cams in such wise that only a slight increase in the value of the pressure in the receiver system and acting through the tube 256 will cause the contact 229 to break the circuit of the relay 280 to initiate still another step of unloading.

The same is true of the devices controlling the final step of unloading of a compressor and these devices will, of course, operate in the same manner as those previously described in the event that the receiver pressure continues to increase after the compressor has been three-quarters unloaded.

In this form of the invention as in that previously described, it is, however, not necessary that all the load-controlling devices operate in the order described until the compressor is completely unloaded before additional load may be applied to the compressor. Thus, if it be assumed that with the compressor operating at, say, one-half load, the demands upon storage fluid lower the pressure value thereof to the predetermined minimum the switch means 218 and the load-controlling devices controlled thereby will be caused to act to apply an additional step of loading to the compressor.

This takes place as follows: Upon the occurrence of a decrease in the value of the storage pressure this pressure drop is reflected in the action of the tube 256. The unsupported portions of said tube will move to assume their normal shapes thus tilting the outer end of the lever 268 downwardly. Inasmuch as the lever 272 must describe a similar movement the differential gearing including the pinion 251 and the gear 252 will operate to rotate the cams in a counter-clockwise direction, as Figure 10 is viewed from the right hand end of the drawings. This movement of the cams will continue during a falling receiver pressure and when such pressure reaches a predetermined minimum value the cams will have reached a position in which the roller 234 of the contact 228 will rest adjacent the end of the surface 239. In this way the contact 228 is brought into engagement with the stationary contact 224 and the relay 279 is thereby energized.

Upon energization of the relay 279 its linkage 287 will tilt the switch 289 for energizing the solenoid 183 of the valve mechanism 180 and cause the armature 203 to tilt the bar 200 upwardly. This movement of the bar 200 will unseat the valve 192 and enable the valve 198 to be moved to its seat by the spring acting against said valve. In the new positions of the valves pressure fluid will flow from the recess 188 through the chamber 187, the conduit 207 and associated conduits to the clearance valves 31—33, for closing them, and to the pair of bellows 135.

The compressor will then be three-quarters loaded and the primary bellows 138 of the pair 135 will be immediately extended to its full length and thereby impart a partial movement to the cams of the switch means so that the roller 234 of the contact 227 will be located more closely to the end of the surface 240. Meanwhile a restricted flow of pressure fluid into the secondary bellows 139, of the pair 135, is taking place and said bellows is being gradually extended to slowly rotate the cames to a position in which the roller 234 rests upon the curved surface 241. These parts are then in such relative positions that only a very slight further decrease in the value of the pressure in the receiver system, as reflected through the action of the tube 256 and elements operated thereby, will effect a slight rotative movement of the cams sufficient to place the end portion of the surface 239 of the cam 235 beneath the roller 234 carried by the contact 227. The devices acting in response to the closing of the contact 227 will then operate to apply the final step of loading to the compressor.

I claim:

1. The combination of a compressor, a plurality of load-controlling devices for effecting a step-by-step loading and unloading of the compressor, a receiver for the discharge output of the compressor, means for controlling the operation of the load-controlling devices acting in response to variations in the pressure in the receiver to effect a step-by-step variation in the load of the compressor, a plurality of actuators for actuating the said means to a controlling position controlled by the first-mentioned means to cause operation of an actuator during each operation of the first said means, and means responsive to a variation of the pressure in the receiver occurring subsequently to such positioning of the first-mentioned means for further actuating the first-mentioned means to effect the operation of another load-controlling device.

2. The combination of a compressor, a plurality of load-controlling devices for effecting a step-by-step loading and unloading of the compressor, a receiver for the discharge output of the compressor, means for controlling the operation of the load-controlling devices acting in response to variations in the pressure in the receiver to effect a step-by-step variation in the load of the compressor, a plurality of pressure responsive actuators for actuating the said means to a controlling position upon operation of a load controlling device and being controlled by the first mentioned means to cause operation of an actuator during each operation of the first said means, and means responsive to a variation in the value of the pressure in the receiver occurring subsequently to such positioning of the first-mentioned means and operatively connected to the first-mentioned means for actuating the first said means to effect the operation of another load-controlling device.

3. The combination of a compressor, a plurality of load-controlling devices for effecting a step-by-step loading and unloading of the compressor, a receiver for the discharge output of the compressor, means for controlling the operation of the load-controlling devices acting in response to variations in the pressure in the receiver to effect a step-by-step variation in the load of the compressor, a plurality of actuators each connected to operate simultaneously with a load-controlling device for effecting additional steps of adjustment of the first-mentioned means toward a load-controlling position and being controlled by the first-mentioned means, and means acting responsively to a variation in the value of the pressure in the receiver occurring subsequently to such positioning of the first-mentioned means for actuating the first said means to effect the operation of another load-controlling device.

4. The combination of a compressor, a plurality of load-controlling devices for effecting a step-by-step loading and unloading of the compressor, a receiver for the discharge output of the compressor, means for controlling the operation of the load-controlling devices, a plurality of groups of actuators acting to impart a plurality of steps of adjustment to the first-mentioned means for moving said first-mentioned means from one load-controlling position to another and being controlled by the said first-mentioned means, and means acting responsively to a variation in the value of the pressure in the receiver occurring subsequently to such positioning of the first-mentioned means for actuating the first said means to effect the operation of another load-controlling device.

5. The combination of a compressor, a plurality of load-controlling devices for effecting a step-by-step loading and unloading of the compressor, a receiver for the discharge output of the compressor, means acting in response to the pressure within the receiver for successively initiating action of the load-controlling devices in accordance with variations in the pressure in the receiver, and means controlled by the first said means and operatively connected thereto to effect additional steps of adjustment of the first-mentioned means for moving the first-mentioned means from one load-controlling position to another.

6. The combination of a compressor, a plurality of load-controlling devices for effecting a step-by-step loading and unloading of the compressor, a receiver for the discharge output of the compressor, means acting in response to the pressure within the receiver for successively initiating action of the load-controlling devices to effect a step-by-step variation in the load of the compressor, and pressure responsive actuators operatively connected to the said means to effect additional steps of adjustment of the said means to advance said means toward a load-controlling position.

7. The combination of a compressor, a plurality of load-controlling devices for effecting a step-by-step loading and unloading of the compressor, a receiver for the discharge output of the compressor, means acting in response to the pressure within the receiver for successively initiating action of the load-controlling devices to effect a step-by-step variation in the load of the compressor, and a plurality of groups of pressure responsive actuators for imparting a series of impulses to the said means and the actuators of a group acting successively to actuate the said means toward a load-controlling position.

8. The combination of a compressor, a plurality of load-controlling devices for effecting a step-by-step loading and unloading of the compressor, a receiver for the discharge output of the compressor, means acting in response to the pressure within the receiver for successively initiating action of the load-controlling devices to effect a step-by-step variation in the load of the compressor, a plurality of pressure responsive actuators controlled by the said means to operate simultaneously with the operation of a load-controlling device to move the said means toward a new load-controlling position.

9. The combination of a compressor, a plurality of load-controlling devices for effecting a step-by-step loading and unloading of the compressor, a receiver for the discharge output of the compressor, means acting in response to the pressure within the receiver for successively initiating action of the load-controlling devices to effect a step-by-step variation in the load of the compressor, and a plurality of pairs of pressure responsive actuators controlled by the said means and operatively connected thereto and the actuators of a pair acting successively to move the said means in step-by-step fashion toward a load-controlling position.

10. The combination of a compressor, a plurality of load-controlling devices for effecting a step-by-step loading and unloading of the compressor, a receiver for the discharge output of the compressor, means acting in response to the pressure within the receiver for successively initiating action of the load-controlling devices to effect a step-by-step variation in the load of the compressor, and a plurality of pairs of pressure responsive actuators controlled by the said means, and one pressure responsive actuator of a pair operating simultaneously with the operation of a load-controlling device and the other actuator of such pair operating subsequently to the operation of said one pressure responsive device to move said means toward a load-controlling position.

11. The combination of a compressor, a plurality of load-controlling devices for effecting a step-by-step loading and unloading of the compressor, a receiver for the discharge output of the compressor, means movable to different controlling positions for causing the operation of the load-controlling devices to effect a step-by-step variation in the load of the compressor, a plurality of pairs of pressure responsive actuators acting successively for moving said means from one controlling position toward another and one actuator of a pair operating simultaneously with the operation of a load-controlling device, means for causing a delayed action of the other actuator of such pair, and means responsive to a variation in the value of the pressure in the receiver occurring subsequently to the action of the second acting actuator for actuating the first-mentioned means to effect the operation of another load-controlling device.

12. The combination of a compressor, a plurality of pressure fluid actuated load-controlling devices for effecting a step-by-step loading and unloading of the compressor, a receiver for the discharge output of the compressor, means for controlling the operation of the load-controlling devices, a plurality of spring-pressed bellows for actuating the said means from one controlling position to another and being controlled by the said means to initiate action of said bellows simultaneously with the operation of the load-controlling devices, and means responsive to variation of the pressure in the receiver occurring subsequently to the operation of the load-controlling devices and the bellows for actuating the first-mentioned means through a load-controlling position.

13. The combination of a compressor, a plurality of pressure fluid actuated load-controlling devices for effecting a step-by-step loading and unloading of the compressor, a receiver for the discharge output of the compressor, means for controlling the admission and exhaust of pressure fluid to and from the load-controlling devices, a plurality of spring-pressed bellows for actuating the said means from one load-controlling position to another, means to afford constant communication with a bellows and a load-controlling device to assure the flow of pressure to and from a bellows simultaneously with the admission and exhaust of pressure fluid to and from an associated load-controlling device, and means responsive to a variation of the pressure in the receiver occurring subsequently to the operation of a load-controlling device and its associated bellows for actuating the first-mentioned means through a load-controlling position.

14. The combination of a compressor, a plurality of pressure fluid actuated load-controlling devices for effecting a step-by-step loading and unloading of the compressor, a receiver for the discharge output of the compressor, fluid actuated valves for controlling the flow of pressure fluid to and from the load-controlling devices, a pilot valve for controlling the flow of pressure fluid to and from the fluid actuated valves, a plurality of pairs of spring-pressed bellows for actuating the pilot valve from one controlling position to another, means to afford constant communication between a load-controlling device and a pair of bellows, means for causing a delayed action of one bellows of a pair, and means acting responsively to a variation of the pressure in the receiver occurring subsequently to the operation of a load-controlling device and its associated pair of bellows for actuating the pilot valve through a load-controlling position to initiate action of another load-controlling device and the pair of bellows associated with such other load-controlling device.

15. The combination of a compressor, a plurality of pressure fluid actuated load-controlling devices for effecting a step-by-step loading and unloading of the compressor, a receiver for the discharge output of the compressor, valve means for controlling the admission and exhaust to and from the load-controlling devices, electro-responsive devices for actuating the valve means, switches for the electro-responsive devices, control means for the switches, means for actuating the control means to controlling positions with respect to the switches and being controlled by the valve means, and means acting responsively to a predetermined slight variation in the value of the pressure in the receiver occurring subsequently to such positioning of the control means to actuate the control means for operating a switch and thereby cause the operation of an electro-responsive device and a valve means associated therewith for effecting the operation of a load-controlling device.

16. The combination of a compressor, a plurality of pressure fluid actuated load-controlling devices for effecting a step-by-step loading and unloading of the compressor, a receiver for the discharge output of the compressor, a plurality of valve means for controlling the admission and exhaust of pressure fluid to and from the load-controlling devices, individual electro-responsive devices for each valve means, individual switch means for the electro-responsive devices, control means for the switch means, means operating in response to the operation of the valve means for moving the control means to its controlling positions, and means acting responsively to a predetermined variation in the value of the pressure in the receiver occurring subsequently to such positioning of the control means to move the control means through a controlling position and thereby cause the operation of an electro-responsive device and its associated valve means for effecting the operation of a load-controlling device.

17. The combination of a compressor, a plurality of pressure fluid actuated load-controlling devices for effecting a step-by-step loading and unloading of the compressor, a receiver for the discharge output of the compressor, individual electrically operated devices for controlling the operation of the load-controlling devices, individual switches for the electrically operated devices, control means for the switches, means controlled by the electrically operated devices for moving the control means from one controlling position to another, and means acting responsively to the variation of pressure in the receiver occurring subsequently to such positioning of the control means for actuating the control means to effect the operation of a switch and thereby cause the electrically operated device associated with such switch to initiate the operation of a load-controlling device.

PAUL A. YERGER.